United States Patent [19]

Jonsson et al.

[11] 3,907,534
[45] Sept. 23, 1975

[54] METHOD AND APPARATUS FOR MAKING SURFACE TREATED GLASS CONTAINERS

[75] Inventors: Bo Ragnar Jonsson, Hammar;
Gunnar Georg Toll; Bo Torsten Krister Bodelind, both of Bohus, all of Sweden

[73] Assignee: Aktiebolaget Platmanufaktur, Malmo, Sweden

[22] Filed: Oct. 3, 1974

[21] Appl. No.: 511,796

Related U.S. Application Data

[63] Continuation of Ser. No. 408,312, Oct. 23, 1973, abandoned, which is a continuation-in-part of Ser. No. 238,693, March 27, 1972, abandoned, which is a continuation of Ser. No. 49,229, June 24, 1970, abandoned.

[30] Foreign Application Priority Data

July 21, 1969 Sweden.............................. 10234/69

[52] U.S. Cl. .......................... 65/30; 65/60; 65/208; 65/325; 118/48
[51] Int. Cl.² ...................... C03C 17/22; C03B 9/00
[58] Field of Search ................ 65/30, 60, 208, 325; 118/48; 117/124 A, 124 B, 124 R, 106

[56] References Cited
UNITED STATES PATENTS

| | | | |
|---|---|---|---|
| 3,218,220 | 11/1965 | Weber ................................. | 65/30 X |
| 3,337,321 | 8/1967 | Teaque et al. .......................... | 65/30 |
| 3,438,803 | 4/1969 | Dubble et al. ...................... | 65/30 X |
| 3,505,048 | 4/1970 | Plumat .................................. | 65/30 |
| 3,519,408 | 7/1970 | Russell.................................. | 65/24 |
| 3,561,940 | 2/1971 | Scholes.............................. | 65/30 X |
| 3,730,696 | 5/1973 | Pointu et al. .......................... | 65/30 |

*Primary Examiner*—Robert L. Lindsay, Jr.
*Attorney, Agent, or Firm*—Hane, Baxley & Spiccens

[57] ABSTRACT

A hollow glass container having treated inner and outer surfaces is made by extruding an elongated string of glass at a temperature higher than its transformation temperature and coating the outer surface of the mass as it is being extruded. Thereafter, the mass is cut into blanks, and each blank is formed into a hollow container.

5 Claims, 3 Drawing Figures

FIG. 1
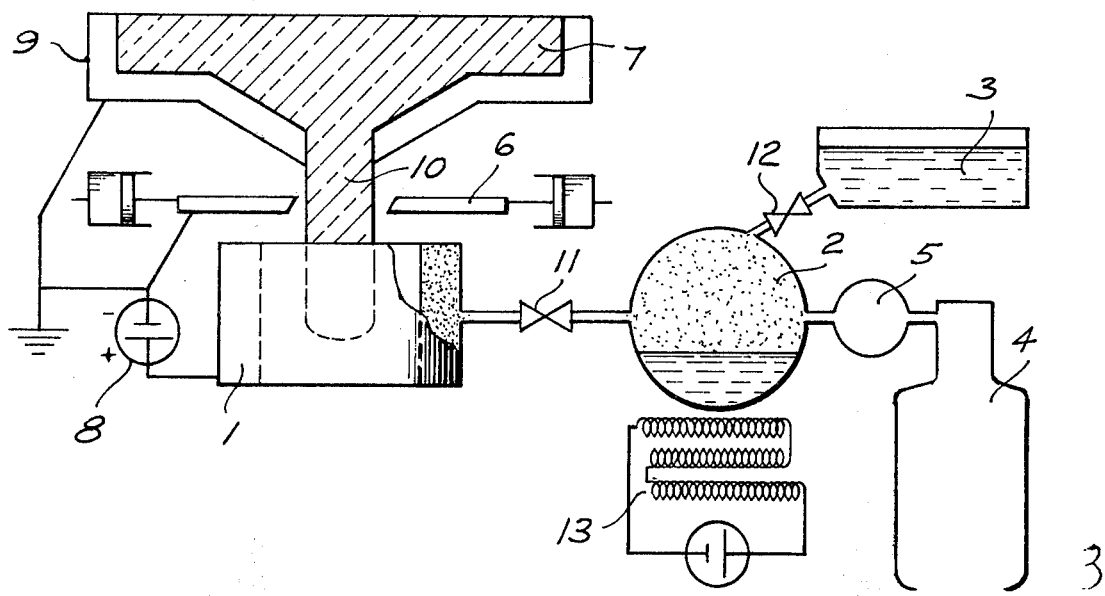
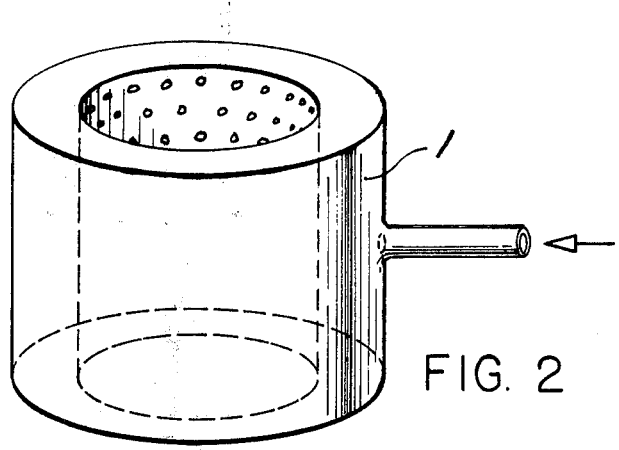
FIG. 2
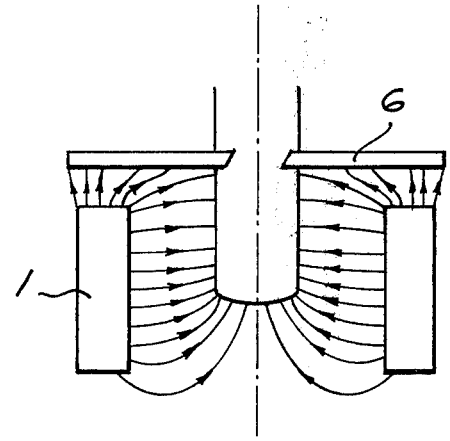
FIG. 3

METHOD AND APPARATUS FOR MAKING SURFACE TREATED GLASS CONTAINERS

This is a continuation of application Ser. No. 408,312, filed Oct. 23, 1973, now abandoned which in turn is a continuation-in-part application of Ser. No. 238,693, filed Mar. 27, 1972, now abandoned, and which is a continuation of application Ser. No. 49,229, filed June 24, 1970 and now abandoned.

The present invention pertains to the making of glass containers, and more particularly to such containers having both their inner and outer surfaces treated to improve their properties such as strength, scratch resistance, etc.

A method for achieving the surface treatment of a glass container is to subject the container to a bombardment of ions or other particles. If an ion bombardment takes place, an exchange of ions occurs in the surface of the container. It has been found, however, that a bombardment of glass containers that have already been formed does not give the desired properties because the ion penetration will not be complete. In addition, during a bombardment it is more likely that pits and surface cracks in the glass will be filled. Furthermore, it is difficult to treat the internal surface of glass containers and virtually impossible when it comes to glass bottles.

An object of the present invention is to achieve a considerably better surface treatment than has previously been possible.

The novelty according to the invention is that it is not the object that has already been formed that is treated. Instead, it is the glass blank used to form the container which is surface treated. This blank usually has a temperature of at least 1,000°C. In this condition the molten glass is very receptive to an ion exchange and to particles so that the penetration depths will be substantial. Then the blank can be formed into the desired shaped container.

It should be noted that an advantage to such a procedure is that after the container is formed its inner surface has also been treated.

Other objects, features and advantages of the invention will be apparent from the following detailed description when read with the accompanying drawing which shows apparatus for performing the invention.

In the drawing:

FIG. 1 shows apparatus for forming glass blanks and bombarding the blanks with ions in accordance with the invention;

FIG. 2 shows in perspective the spraying collar through which the blanks pass; and FIG. 3 shows the electric field configuration for accelerating the ions.

In FIG. 1 a glass tank furnace 9 contains molten glass 7. In the base of furnace 9 there is an outlet through which is extruded a string-like mass 10 of molten glass at a temperature above the transition temperature of the glass. Below the outlet of tank furnace 9 is a collar 1 having an inner diameter surface perforated with openings (see FIG. 2) and having an annular cavity connected via a valve 11 to an enclosed tank 2. As shown in FIG. 1, the string-like mass 10 passes through the collar 1 and in passing through will be bombarded with ions or particles as will hereinafter be described.

Cutting knives 6 are disposed between collar 1 and the outlet of the tank furnace 9 and are periodically driven toward each other to cut the string-like mass 10 into blanks or parisons for making the containers.

In order to accelerate ions from within collar 1 toward mass 10, a voltage source 8 is connected between collar 1 and knives 6 to create the electric field shown in FIG. 1.

Tank 2 which feeds the ions via valve 11 to collar 1, can be heated by heating unit 13 consisting of heating coils and a voltage source.

A valve 12 connects receptacle 3 to tank 2. The material within receptacle 3 contains the ions or particles in solution which are used to surface treat the glass. It has been found that ions of the following elements have the desired properties for surface treating the glass blanks: Li, Na, K, and Sn. The liquid containing the ions is fed into tank 2 where it is mixed with a gaseous carrier fed via reduction valve 5 from tank 5 which contains an inert gas such as nitrogen or dried air.

Thus, in tank 2 a mixture of carrier gas and ion solution is heated to a desired temperature and raised to a desired pressure and then fed to collar 1.

The apparatus described above functions in the following way. The fluid with the particles or ions from the receptacle 3 is conducted to the tank 2. In this tank the fluid with the particles or ions is heated to a temperature below the boiling point so that a high gas pressure is obtained. The gas vehicle from the container 4 is used to accelerate the flow of ions from the receptacle 2 to the ring 1. The gas vehicle should then be of such a kind that it counteracts the oxidation of the ions when they come into contact with the oxygen in the air; consequently, nitrogen is preferred. The ions escape from the perforations of collar 1 and move with such a speed that a great penetration depth is obtained. The electric field produced by the voltage source 8 contributes towards the particle speed. The potential of the electrical source should be appropriately 100 volts. From an electrical point of view, it is appropriate to have +100 volts and to ground the tank furnace and knives to collar 0. An appropriate temperature for the molten glass at the outlet of the tank furnace 9 is in the order of 1100°C.

It has been found that with a field of 100v/cm the particles reach speeds of from 1 to 3 meters a second and will penetrate to about $10\mu$.

As a practical example, string-like masses 10 cm. long were formed at the rate of 40 pieces per second. The masses had a temperature of 1140°C. A potential difference between the ring and the furnace (knives and glass) of 100 volts was established. In one case the masses were bombarded with a vapor of Sn cl4 in a nitrogen carrier having a temperature of 25°C. and a pressure of 2 kg/cm². In another case, the masses were bombarded with Kcl particles in nitrogen gas at a temperature of 25°C. and a pressure of 2 kg/cm².

Thereafter, the blanks so treated were fed to a conventional Is-machine made by Emhart of Hartford, Connecticut where they were blown into bottles.

Because the forming operation followed the surface treatment, the inner surface of the formed containers is automatically treated since it is actually part of the surface of the blank.

What is claimed is:

1. The method of making a hollow glass container whose inner and outer surfaces have been treated, comprising the steps of extruding a string of glass at a temperature higher than the transformation temperature of the glass, accelerating particles in the gaseous state, said particles being ions selected from the group consisting of lithium, sodium, potassium and tin at least onto the circumferential surface of the string of glass at said temperature, cutting the string of glass into blanks, and subsequently shaping the blanks into hollow containers in such a way that the circumferential surface of the string of glass becomes both the inner and outer surfaces of the container.

2. The method of claim 1 wherein the blanks are blown into hollow containers.

3. Apparatus for making surface treated glass blanks comprising a tank furnace for containing molten glass, an outlet in the bottom of said tank through which molten glass can flow, a hollow collar positioned below said outlet so that molten glass can flow through the central opening of said collar, a plurality of openings in the inner diameter surface of said collar, storage means for storing particles under pressure, means for heating said storage means, and conduit means connecting said storage means to the interior of said hollow collar whereby particles can be propelled onto molten glass flowing through the central opening of said hollow collar.

4. The apparatus of claim 3 further comprising cutting means positioned between said outlet and said hollow collar for cutting flowing molten glass into blanks.

5. The apparatus of claim 4 further comprising means for generating an electric field between said container and said cutting means whereby particles flowing from the openings in the central wall of said collar can be accelerated toward molten glass flowing through the central opening of said collar.

* * * * *